United States Patent
Braun et al.

(10) Patent No.: US 7,585,250 B2
(45) Date of Patent: Sep. 8, 2009

(54) METHOD FOR OPERATING A MOTOR VEHICLE

(75) Inventors: Harald Braun, Esslingen (DE); Norbert Ebner, Ludwigsburg (DE); Michael Fischer, Ludwigsburg (DE); Deborah Mowll, Stuttgart (DE); Torsten Scholt, Stuttgart (DE); Michael Schopper, Stuttgart (DE)

(73) Assignee: Daimler AG, Stuttgart (DE)

( * ) Notice: Subject to any disclaimer, the term of this patent is extended or adjusted under 35 U.S.C. 154(b) by 419 days.

(21) Appl. No.: 10/553,415

(22) PCT Filed: Feb. 25, 2004

(86) PCT No.: PCT/EP2004/001826

§ 371 (c)(1),
(2), (4) Date: Sep. 19, 2006

(87) PCT Pub. No.: WO2004/091961

PCT Pub. Date: Oct. 28, 2004

(65) Prior Publication Data

US 2007/0054773 A1    Mar. 8, 2007

(30) Foreign Application Priority Data

Apr. 16, 2003 (DE) .............................. 103 17 501

(51) Int. Cl.
*B60W 10/06* (2006.01)
*B60W 10/08* (2006.01)
(52) U.S. Cl. .......................................... 477/200; 477/4
(58) Field of Classification Search .......... 477/3, 477/4, 92, 114, 184, 187, 199, 200
See application file for complete search history.

(56) References Cited

U.S. PATENT DOCUMENTS

| 6,135,920 A | 10/2000 | Kamiya et al. |
| 6,347,608 B1 * | 2/2002 | Hara et al. ............... 123/179.4 |
| 6,540,644 B2 * | 4/2003 | Morimoto et al. ........... 477/102 |
| 6,754,579 B2 * | 6/2004 | Kamiya et al. .............. 701/112 |
| 6,875,153 B2 * | 4/2005 | Jager et al. .................... 477/71 |
| 2002/0086772 A1 | 7/2002 | Abe et al. |
| 2006/0142121 A1 * | 6/2006 | Moriya ....................... 477/199 |
| 2007/0114841 A1 * | 5/2007 | Maruyama et al. ........... 303/89 |

FOREIGN PATENT DOCUMENTS

| DE | 199 27 975 A1 | 12/1999 |
| DE | 10121158 A1 | 11/2001 |
| EP | 1065091 A2 | 1/2001 |

OTHER PUBLICATIONS

English language version of answer dated Feb. 1, 2005, in PCT/EP2004/001826.

* cited by examiner

*Primary Examiner*—Roger Pang
(74) *Attorney, Agent, or Firm*—Crowell & Moring LLP

(57) ABSTRACT

In a motor vehicle having an internal combustion engine which has an automatic start/stop device, and a controllable brake device at the start of and during an automatic stop phase, the effect of a braking torque which is greater than a threshold value is ensured. For this purpose, the brake device can increase the braking torque. The threshold value is previously calculated in such a way that the motor vehicle is reliably prevented from rolling away. As a result, the internal combustion engine can be stopped frequently, and at the same time unintentional rolling away of the motor vehicle during the stop phase can be avoided.

11 Claims, 2 Drawing Sheets

METHOD FOR OPERATING A MOTOR VEHICLE

BACKGROUND AND SUMMARY OF THE INVENTION

This application claims the priority of German patent document 103 17 501.6, filed Apr. 16, 2005 (PCT International Application No. PCT/EP2004/001826), the disclosure of which is expressly incorporated by reference herein.

The invention relates to a method for operating a motor vehicle.

German patent document DE 199 27 975 A1 discloses a method for operating a motor vehicle having an internal combustion engine, an automatic start/stop device for the internal combustion engine and a controllable brake device. When a number of "stop conditions" are fulfilled, the internal combustion engine is stopped by the automatic start/stop device. A "stop condition" here is that the braking force which is applied by a vehicle driver by means of a brake pedal (or the applied braking torque) is sufficient to prevent the motor vehicle from moving. If, by reducing a degree of activation of the brake pedal, the vehicle driver reduces the braking force to such an extent that it would no longer be sufficient to prevent the motor vehicle from moving, the brake device is actuated in such a way that the braking force is maintained. This reduction in the braking force is evaluated simultaneously as a start signal so that the internal combustion engine is started after the brake device is actuated. Actuating the brake device at the end of the stop phase prevents the motor vehicle from rolling away before it is started.

Published U.S. Patent Application 2002/086772 A1 describes a method for operating a motor vehicle in which an internal combustion engine is stopped by means of an automatic start/stop device if the braking force applied by a vehicle driver by means of a brake pedal is greater than a fixed threshold value. If the vehicle driver reduces the braking force to such an extent that it becomes smaller than the fixed threshold value, a brake device is actuated in such a way that the braking force is maintained.

German patent document DE 101 21 158 A1 discloses a method for automatically activating a vehicle brake in conjunction with a starting clutch which is activated by extraneous force. The clutch is activated in such a way that it does not completely interrupt the transmission of torque between a drive motor and transmission. It is checked whether the velocity of the vehicle is zero when a forward gear speed is engaged, or whether the motor vehicle is rolling backwards. If so, the vehicle brake is activated with extraneous force and the starting clutch is opened.

One object of the present invention is to provide a method which achieves low fuel consumption, low exhaust gas emissions, and reliable operation of the motor vehicle.

This and other objects and advantages are achieved by the method according to the invention, in which the braking torque applied by the brake device can be increased by a control device independently of the degree of activation of a brake pedal. The brake device may be embodied as a service brake, parking brake or supplementary brake device of the motor vehicle. The brake device can have a plurality of brake circuits, with it being possible for the driver to apply a braking torque directly by means of the brake pedal via a first brake circuit, and in accordance with a control device via a second brake circuit by actuating suitable actuating elements. The brake device may be activated, for example, electrohydraulically or electromechanically.

According to the invention, at the start of, and during, the automatic stop phase of the internal combustion engine, the control device checks whether the currently acting braking torque is smaller than a threshold value. The control device determines the threshold value as a function of state variables and/or operating variables of the motor vehicle. State variables may be, for example: weight or load of the motor vehicle, state or degree of wear of the brake device. An operating variable may be, for example, a temperature of the brake device. The aforesaid variables may be measured by means of suitable sensors or determined from other variables by means of suitable methods.

When there is a positive result of the check, the control device increases the braking torque to a value which is greater than or equal to the threshold value and maintains this braking torque. The threshold value is dimensioned, for example, in such a way that movement of the motor vehicle is reliably prevented, even when the internal combustion engine is stopped. The first check may occur just before, at the same time as, or just after the internal combustion engine stops.

After the internal combustion engine starts, the braking torque is reduced again, for example via a ramp, in order to start up the motor vehicle. This ensures that the motor vehicle can be started up from a stationary state without rolling in the opposite direction to the desired direction.

With the method according to the invention the motor vehicle is reliably prevented from rolling away during a stop phase of the internal combustion engine. For the internal combustion engine to stop it is thus not necessary for the vehicle driver to apply a braking torque which is sufficient to stop the motor vehicle. The internal combustion engine can be stopped without the risk of the motor vehicle rolling away even if the vehicle driver exerts only a very small braking torque, or no braking torque.

As a result, the internal combustion engine can be stopped frequently, while achieving low fuel consumption and low exhaust gas emissions, in particular in urban traffic. At the same time, reliable operation of the motor vehicle is ensured since the motor vehicle is protected against unintentional rolling away during the stop phases of the internal combustion engine.

When operating variables and/or state variables are taken into account, the threshold value can be defined in such a way that the motor vehicle is prevented from rolling away without the threshold value being set too high. As a result, in addition to reliable operation, a high degree of spontaneity of the motor vehicle is made possible when the internal combustion engine starts automatically.

In one embodiment of the invention, the control device determines the threshold value as a function of environmental variables (such as, for example, a gradient of the underlying surface or an external temperature). These variables may be measured by suitable sensors, or determined from other variables by means of suitable methods. As a result, the threshold value can be defined precisely with respect to safety and spontaneity.

In another embodiment of the invention the braking torque necessary to stop the vehicle is determined by the control device before the brake device is actuated. The aforesaid threshold value is set to a value which is greater than or equal to the specific braking torque, ensuring that the motor vehicle is prevented from rolling away. The threshold value may be higher than the specific torque by an amount constituting a safety margin. As a result, inaccuracies in the determination of the necessary braking torque can be compensated.

In contrast to the method according to the invention, it would always be possible to apply a maximum braking torque during a stop phase. However, since braking torque takes a certain time to be reduced, this would adversely affect the spontaneity of the motor vehicle when the internal combustion engine is started automatically and subsequently accelerated. Furthermore, increasing a braking torque requires an amount of energy which is greater the higher the setting of the braking torque. For example, in a hydraulic brake device it is necessary to build up a hydraulic pressure which increases with the braking torque. By setting only the level of braking torque which is just necessary it is thus possible to save energy (and thus fuel) compared to setting the maximum braking torque.

In one refinement of the invention, during the stop phase the control device monitors whether the motor vehicle is moving, for example, by monitoring rotational wheel speeds or the rotational speed at an output of a transmission which is arranged downstream of the internal combustion engine. For this purpose, the control device can, for example, sense the rotational speeds or receive them from other control devices via signal lines. In the case of movement of the motor vehicle, the control device actuates the brake device in such a way that the braking torque is increased. A movement is detected, for example, if one or more of the aforesaid rotational speeds are higher than threshold values. This process can be repeated during the stop phase so that the braking torque can also be increased repeatedly.

If an excessively low braking torque has been set at the beginning of the stop phase due to uncertainties in the calculation of the necessary braking torque, the motor vehicle is thus reliably prevented from rolling away.

In one embodiment of the invention, the control device increases the braking torque before the internal combustion engine starts. When the internal combustion engine starts, changes may occur in the forces and torques acting on the motor vehicle. Increasing the braking torque ensures that the motor vehicle does not roll even when the conditions change. This is important in particular if the braking torque cannot be set very precisely by the control device.

Other objects, advantages and novel features of the present invention will become apparent from the following detailed description of the invention when considered in conjunction with the accompanying drawings.

DETAILED DESCRIPTION OF THE DRAWINGS

Figure 1:
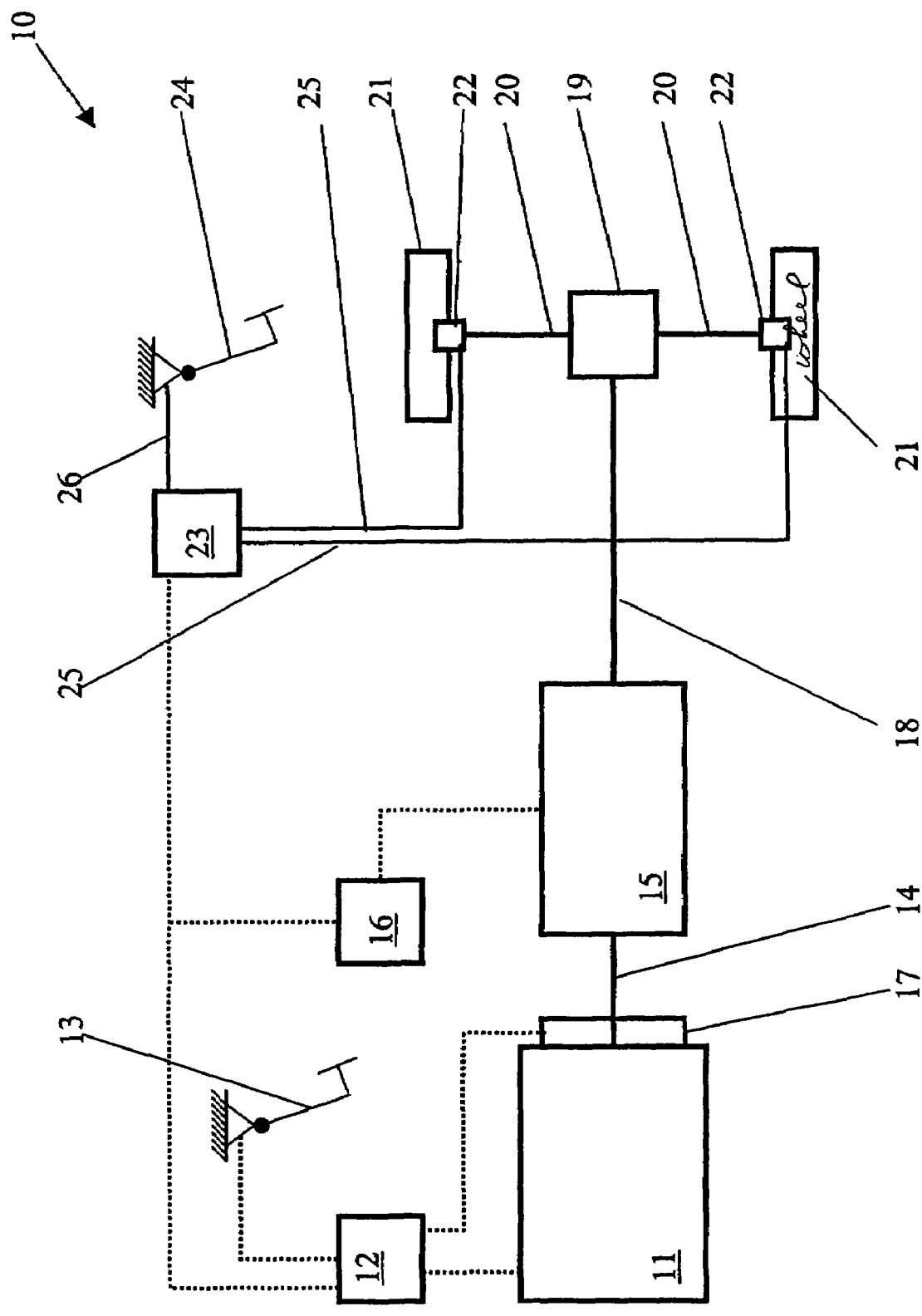
FIG. 1 is a schematic depiction of the drive train of a motor vehicle.

As shown in FIG. 1, the drive train 10 of a motor vehicle (not shown) includes an internal combustion engine 11 which is actuated by a control device 12. For this purpose, the control device 12 has a signal connection to actuating elements (not shown), such as a throttle valve actuator, and sensors, such as rotational speed sensors. Furthermore, the control device 12 has a signal connection to a power actuating element 13 (embodied as an accelerator pedal) by which a vehicle driver can set a torque to be output by the internal combustion engine 11. The control device 12 can calculate further operating variables of the internal combustion engine 11, including for example the torque output by the internal combustion engine 11, from sensed variables.

The internal combustion engine 11 is connected via an output shaft 14 to a transmission 15 (embodied as an automatic transmission) and is actuated by a control device 16.

A starter-generator 17, which is also actuated by the control device 12, is arranged between the internal combustion engine 11 and transmission 15. The starter-generator 17 is connected to a vehicle battery (not shown) and can start the internal combustion engine 11 via the output shaft 14. In the driving mode of the motor vehicle, the starter-generator 17 generates electrical energy for supplying loads in the motor vehicle, and for charging the vehicle battery.

Functions by which, in conjunction with the starter-generator 17, the internal combustion engine 11 can be stopped when stop conditions apply and started when start conditions apply are stored in the control device 12. Together with the starter-generator 17, the control device 12 thus forms an automatic start/stop device for the internal combustion engine 11.

The transmission 15 is connected via a drive shaft 18 to an axle transmission 19 which transmits the output torque of the internal combustion engine 11 to driven vehicle wheels 21 via side shafts 20, in a known fashion.

Hydraulic brake devices 22 which are actuated by a control device 23 via hydraulic lines 25 are arranged on the vehicle wheels 21. The control device 23 is connected via a hydraulic line 26 to a brake pedal 24 by which the vehicle driver can set the braking torque which is applied by the brake devices 22, and thus acts on the motor vehicle. A direct connection is thus produced between the pressure lines 26 and 25 and the brake devices 22.

In order to determine the braking torque acting on the motor vehicle the control device 23 has various pressure sensors (not shown). The braking torque can be calculated from the measured pressures.

The control device 23 can also actuate the brake devices 22 independently of the position of the brake pedal 24, for example on request by the control device 12. The hydraulic pressure which is necessary for this is produced by a pump (not shown).

The braking torque can thus be applied either directly by the vehicle driver via the brake pedal 24, or by means of the control device 23.

Rotational speed sensors (not shown), by which the control device 23 can sense a rotational speed of the vehicle wheels 21, are arranged on the vehicle wheels 21. The velocity of the motor vehicle can be determined from these rotational speeds.

The control devices 12, 16 and 23 have a signal connection to one another via a serial bus connection (for example, a CAN bus). As a result, variables which are sensed (for example, the rotational speed of the vehicle wheels 21) can be exchanged or requests can be transmitted to a control device (for example, the setting of a specific braking torque from the control device 12 of the internal combustion engine 11 to the control device 23 of the brake devices 22). The brake device is actuated at least indirectly by the control device 12 of the internal combustion engine 11.

The transmission may also comprise a manual shift gearbox with a manual or automatic clutch. Moreover, instead of the starter-generator, the motor vehicle can also have a conventional starter.

The direct connection between the brake pedal and the brake devices can also be disconnected, at least in a normal operating mode. In this case, the position of the brake pedal is sensed by a sensor and transmitted to the control device which then actuates the brake devices correspondingly.

Figure 2:
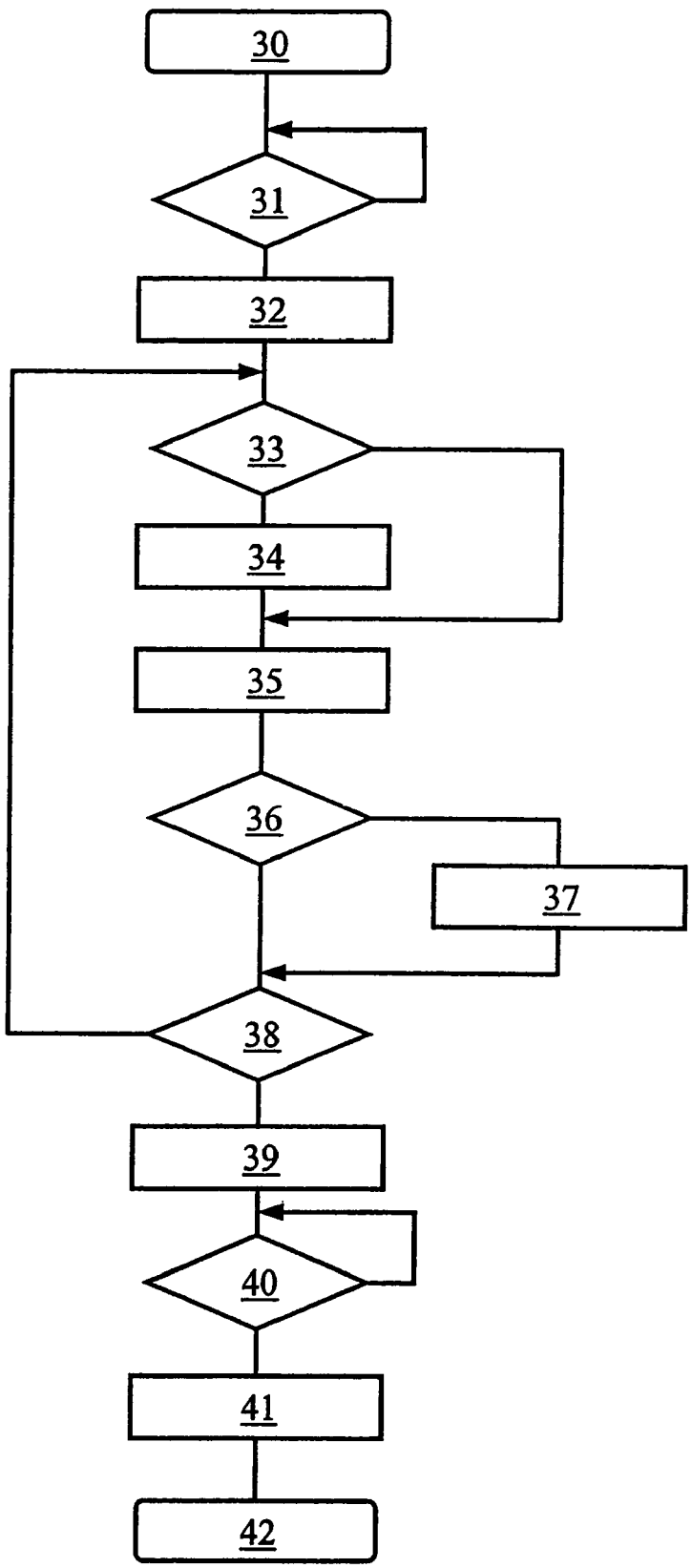
FIG. 2 is a flowchart of a method according to the invention for operating the motor vehicle for an automatic stop and start mode of the internal combustion engine.

FIG. 2 is a flowchart of a method for operating the motor vehicle for an automatic stop and start mode of the internal combustion engine 11. The method, which is processed by the control device 12, starts in block 30. In the following interrogation block 31 it is checked whether conditions for stopping the internal combustion engine 11 are fulfilled. (In particular, it is checked whether the velocity of the motor vehicle is equal to zero and the vehicle driver activates the brake pedal 24, and the degree of activation may also be taken into account.) The activation of the brake pedal 24 is interpreted as a desire on the part of the vehicle driver to stop the motor vehicle, and thus indirectly as a desire to stop the internal combustion engine 11. Furthermore, it is thus detected that the vehicle driver is still actively operating the motor vehicle. If the stop conditions are not fulfilled, the interrogation block 31 is repeated.

If the check in the interrogation block 31 has a positive result, the method is continued in block 32. At this point it is to be noted that in all the interrogation blocks in FIG. 2 the method is continued in accordance with the output of the interrogation block in the downward direction when there is a positive result of the check, and in accordance with the output to the side when there is a negative result.

The braking torque which is necessary to stop the motor vehicle is determined in block 32, according to the following formula:

$$M_{brake\ stop} = (m_{Fzg} * g * \sin \alpha) * r_{wheel} + M_{safety}$$

where $M_{brake\ stop}$ corresponds to the necessary braking torque in [Nm], $m_{Fzg}$ to the mass of the motor vehicle in [kg], g to the acceleration of the earth in $$\left[\frac{m}{s^2}\right],$$

α to the angle of inclination of the underlying surface [rad], $r_{wheel}$ to the radius of the vehicle wheels 21 in [m] and $M_{safety}$ to a safety supplement in [Nm].

The variables which are necessary for the calculation are partially predefined and partially estimated by well known methods.

In the interrogation block 33 it is determined whether the currently acting braking torque is less than the braking torque $M_{brake\ stop}$ which is necessary to stop the motor vehicle. When the interrogation block 33 is run through for the first time, the vehicle driver has set the braking torque by means of the brake pedal 24. When it is run through again, the braking torque may either have been set by the vehicle driver or by the control device 23. When there is a positive check, the control device 12 transmits the calculated braking torque $M_{brake\ stop}$ in block 34 to the control device 23 of the brake device 22 which sets the braking torque by means of a suitable actuation process, thus increasing the braking torque. If the check in the interrogation block 33 has a negative result, the block 34 is not executed and the process continues directly with block 35.

After a sufficient braking torque has been ensured, the control device 12 stops the internal combustion engine 11 in block 35 by suitably actuating the actuating elements of the internal combustion engine 11. A stop phase of the internal combustion engine 11 has thus started.

In the following interrogation block 36 it is determined whether the motor vehicle is moving. To this end it is checked whether the rotational speed of the vehicle wheels 21 is below a limiting value. If not, the braking torque $M_{brake\ stop}$ is increased by a defined value in block 37. Subsequent to block 37, or when there is a positive result in the interrogation block 36, the method is continued in the interrogation block 38, where it is checked whether at least one condition for starting the internal combustion engine 11 is fulfilled. In this context it is checked, for example, whether the vehicle driver is activating the brake pedal 24 less strongly or whether the vehicle driver is requesting a torque to be output by the internal combustion engine 11 via the power actuating element (accelerator pedal) 13. If a start condition is not fulfilled, the method returns to the interrogation block 33, ensuring that the braking torque does not drop below the threshold value $M_{brake\ stop}$ even if the driver reduces the degree of activation of the brake pedal 24.

If one of the start conditions is fulfilled, in block 39 the braking torque is increased by the control device 23. The amount of such increase may be permanently predefined or be dependent on state variables or operating variables of the motor vehicle. At the same time, the internal combustion engine 11 is started by means of the starter-generator 17.

In the following interrogation block 40 it is determined whether the torque output by the internal combustion engine 11 is sufficient to accelerate the motor vehicle in the desired direction or at least to prevent the motor vehicle from rolling in the opposite direction. For this purpose, the torque which is output by the internal combustion engine 11 is compared with the braking torque $M_{brake\ stop}$. If the check has a negative result, the interrogation block 40 is repeated.

If the interrogation in the interrogation block 40 has a positive result, in block 41 the braking torque $M_{brake\ stop}$ is reduced, for example via a ramp whose gradient may be either permanently predefined or dependent on state variables or operating variables of the motor vehicle. The motor vehicle can thus be accelerated in the desired direction. The method is ended in the following block 42.

The method can also be carried out without monitoring the stationary state of the motor vehicle in the interrogation block 36 and/or without increasing the braking torque in block 39.

The processing of the method can also be divided between the control devices 12 and 23.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating a motor vehicle having an internal combustion engine, an automatic start/stop device for the internal combustion engine, a controllable brake device by means of which a braking torque can be applied to the motor vehicle, and a brake pedal which can be activated by a vehicle driver; wherein the brake device is actuated by a control device in an automatic stop phase of the internal combustion engine as a function of a degree of activation of the brake pedal, and the control device can increase the braking torque independently of the degree of activation of the brake pedal; said method comprising:

determining a threshold value as a function of at least one of state variables and operating variables of the motor vehicle, before the brake device is actuated;

at the start of and during said automatic stop phase of the internal combustion engine, checking whether a currently acting braking torque is smaller than the threshold value; and increasing the brake torque to a value which is greater than or equal to the threshold value when said currently acting braking torque is smaller than the threshold value.

2. The method as claimed in claim 1, wherein the control device determines the threshold value as a function of environmental variables before the brake device is actuated.

3. The method as claimed in claim 1, wherein the control device:
   determines a specific braking torque ($M_{Brake\_stop}$) which is necessary to stop the motor vehicle; and
   sets the aforesaid threshold value to a value which is greater than or equal to the specific braking torque ($M_{Brake\_stop}$).

4. The method as claimed in claim 2, wherein the control device:
   determines a specific braking torque ($M_{Brake\_stop}$) which is necessary to stop the motor vehicle; and
   sets the aforesaid threshold value to a value which is greater than or equal to the specific braking torque ($M_{Brake\_stop}$).

5. The method as claimed in claim 1, wherein the control device increases the braking torque before the internal combustion engine starts.

6. The method as claimed in claim 2, wherein the control device increases the braking torque before the internal combustion engine starts.

7. The method as claimed in claim 3, wherein the control device increases the braking torque before the internal combustion engine starts.

8. The method as claimed in claim 4, wherein the control device increases the braking torque before the internal combustion engine starts.

9. A method for operating a motor vehicle having an internal combustion engine, an automatic start/stop device for the internal combustion engine, a controllable brake device by means of which a braking torque can be applied to the motor vehicle, and a brake pedal which can be activated by a vehicle driver; wherein the brake device is actuated by a control device in an automatic stop phase of the internal combustion engine as a function of a degree of activation of the brake pedal, and the control device can increase the braking torque independently of the degree of activation of the brake pedal; said method comprising:
   the control device determining a threshold value as a function of at least one of state variables and operating variables of the motor vehicle, before the brake device is actuated;
   at the start of and during an automatic stop phase of the internal combustion engine, the control device checking whether a currently acting braking torque is smaller than the threshold value; and
   when there is a positive result of the check, the control device increasing the brake torque to a value which is greater than or equal to the threshold value;
   wherein:
   during the stop phase the control device monitors whether the motor vehicle is moving; and
   in case of a movement, the control device actuates the brake device in such a way that the braking torque is increased.

10. A method for operating a motor vehicle having an internal combustion engine, an automatic start/stop device for the internal combustion engine, a controllable brake device by means of which a braking torque can be applied to the motor vehicle, and a brake pedal which can be activated by a vehicle driver; wherein the brake device is actuated by a control device in an automatic stop chase of the internal combustion engine as a function of a degree of activation of the brake pedal, and the control device can increase the braking torque independently of the degree of activation of the brake pedal; said method comprising:
   the control device determining a threshold value as a function of at least one of state variables and operating variables of the motor vehicle, before the brake device is actuated;
   at the start of and during an automatic stop phase of the internal combustion engine, the control device checking whether a currently acting braking torque is smaller than the threshold value;
   when there is a positive result of the check, the control device increasing the brake torque to a value which is greater than or equal to the threshold value;
   wherein:
   the control device determines the threshold value as a function of environmental variables before the brake device is actuated;
   during the stop phase the control device monitors whether the motor vehicle is moving; and
   in case of a movement, the control device actuates the brake device in such a way that the braking torque is increased.

11. A method for operating a motor vehicle having an internal combustion engine, an automatic start/stop device for the internal combustion engine, a controllable brake device by means of which a braking torque can be applied to the motor vehicle, and a brake pedal which can be activated by a vehicle driver; wherein the brake device is actuated by a control device in an automatic stop phase of the internal combustion engine as a function of a degree of activation of the brake pedal, and the control device can increase the braking torque independently of the degree of activation of the brake pedal; said method comprising:
   the control device determining a threshold value as a function of at least one of state variables and operating variables of the motor vehicle, before the brake device is actuated;
   at the start of and during an automatic stop phase of the internal combustion engine, the control device checking whether a currently acting braking torque is smaller than the threshold value; and
   when there is a positive result of the check, the control device increasing the brake torque to a value which is greater than or equal to the threshold value;
   wherein:
   the control device codetermines a specific braking torque ($M_{Brake\_stop}$) which is necessary to stop the motor vehicle;
   the control device sets the aforesaid threshold value to a value which is greater than or equal to the specific braking torque ($M_{Brake\_stop}$);
   during the stop phase the control device monitors whether the motor vehicle is moving; and
   in case of a movement, the control device actuates the brake device in such a way that the braking torque is increased.

* * * * *